Jan. 7, 1936. H. W. SANFORD ET AL 2,026,998
PROGRAM CLOCK
Filed June 15, 1932 3 Sheets-Sheet 1

Inventors
Hugh W. Sanford
Fritz H. Thomas
Dyer & Kiehner
Attorneys

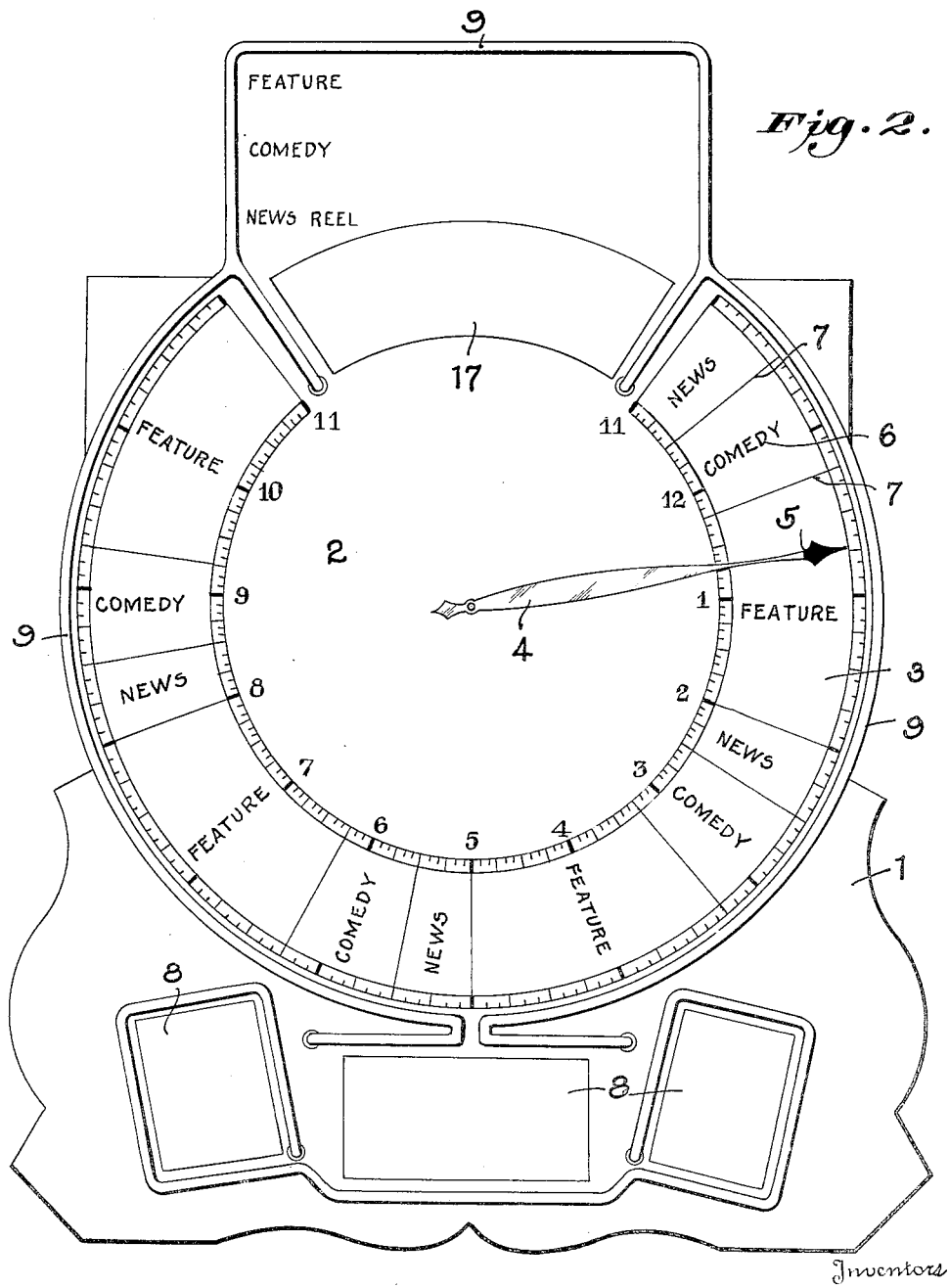

Jan. 7, 1936. H. W. SANFORD ET AL 2,026,998
PROGRAM CLOCK
Filed June 15, 1932 3 Sheets-Sheet 3
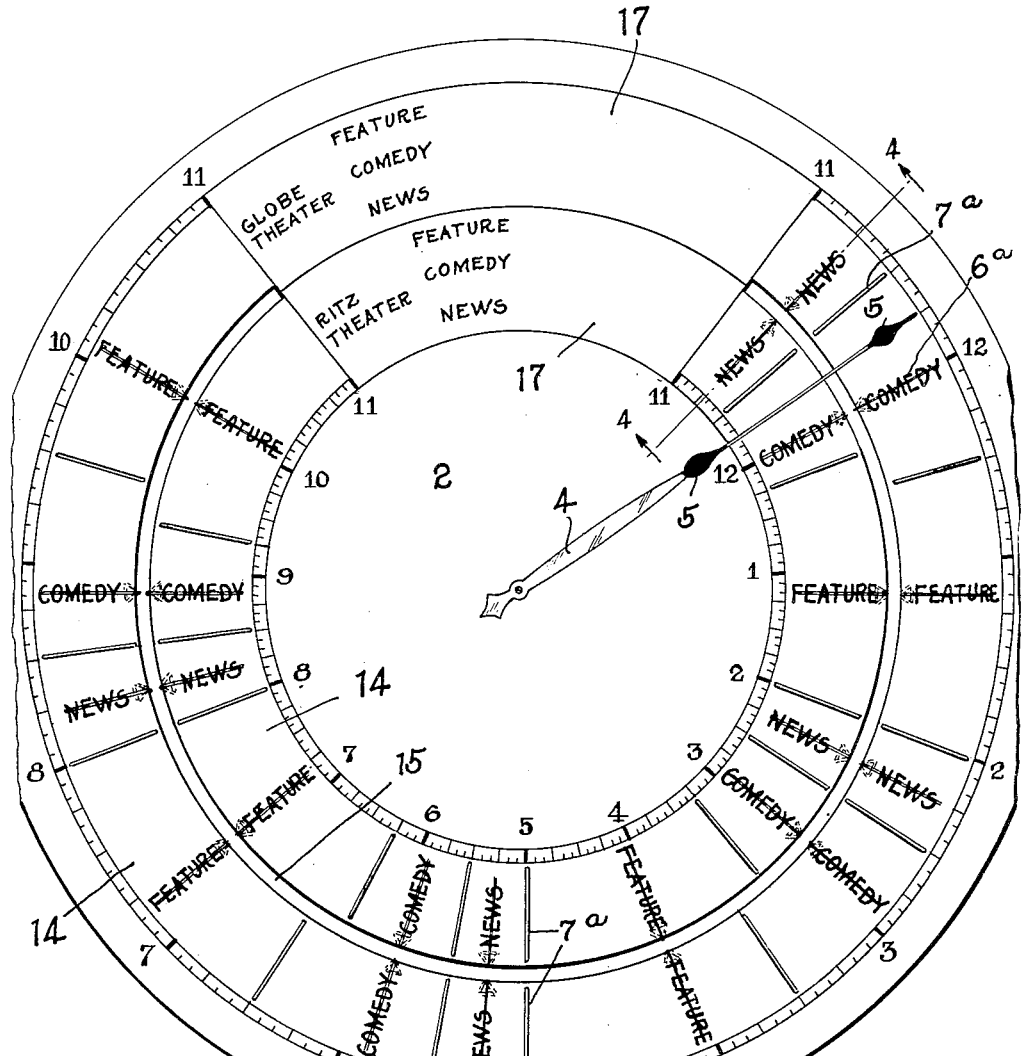

Patented Jan. 7, 1936

2,026,998

UNITED STATES PATENT OFFICE 2,026,998

PROGRAM CLOCK

Hugh W. Sanford, Knoxville, and Fritz H. Thomas, Greeneville, Tenn., assignors to Program Clock, Inc., Knoxville, Tenn., a corporation of Tennessee Application June 15, 1932, Serial No. 617,442

8 Claims. (Cl. 58—126)

Our invention relates to program clocks, and particularly to an instrument or device adapted to be conspicuously displayed in a public place, such for example as a theater entrance or hotel lobby, to apprise the public instantly and accurately of the current condition and future progress of a theatrical program.

An object of the invention is to provide an improvement over the instrument disclosed in the application of one of us, Serial No. 531,583, filed April 20, 1931.

A specific object of the invention is to provide a program clock having an advertising display space and an indicator hand traversing the space during operation of the clock, the hand being specially formed to render all of the space visible at all times, regardless of the position of the hand.

A further object is to provide improved means for indicating the type and time-length of the program units and for facilitating removal and adjustment of the elements employed to perform these functions.

Another object of the invention in certain embodiments is to provide a single instrument for indicating simultaneously the current condition and future progress of a plurality of different programs concurrently exhibited.

Another object is the attainment of a heretofore unrealized degree of accuracy and detail in the indicatory functions served by the device.

It is a general object of the invention to provide a program clock having the foregoing and other objects and advantages, as will more clearly appear from the detailed description hereinafter, which may be readily and inexpensively constructed and which will be durable and efficient in use.

The invention is illustrated in certain preferred forms of embodiment on the accompanying drawings which form part of this application for Letters Patent and in which the same reference character designates the same parts in the several views.

In the drawings,

Fig. 2 is a similar view of a modification;

Fig. 3 is a detail front view of a further modified form;

Fig. 4 is a cross sectional view on the line 4—4 of Fig. 3;

Fig. 5 is a front view of one of the indicating elements shown in Figs. 3 and 4;

Fig. 6 is a side view of another of the indicating elements shown in Fig. 3.

Figure 1:
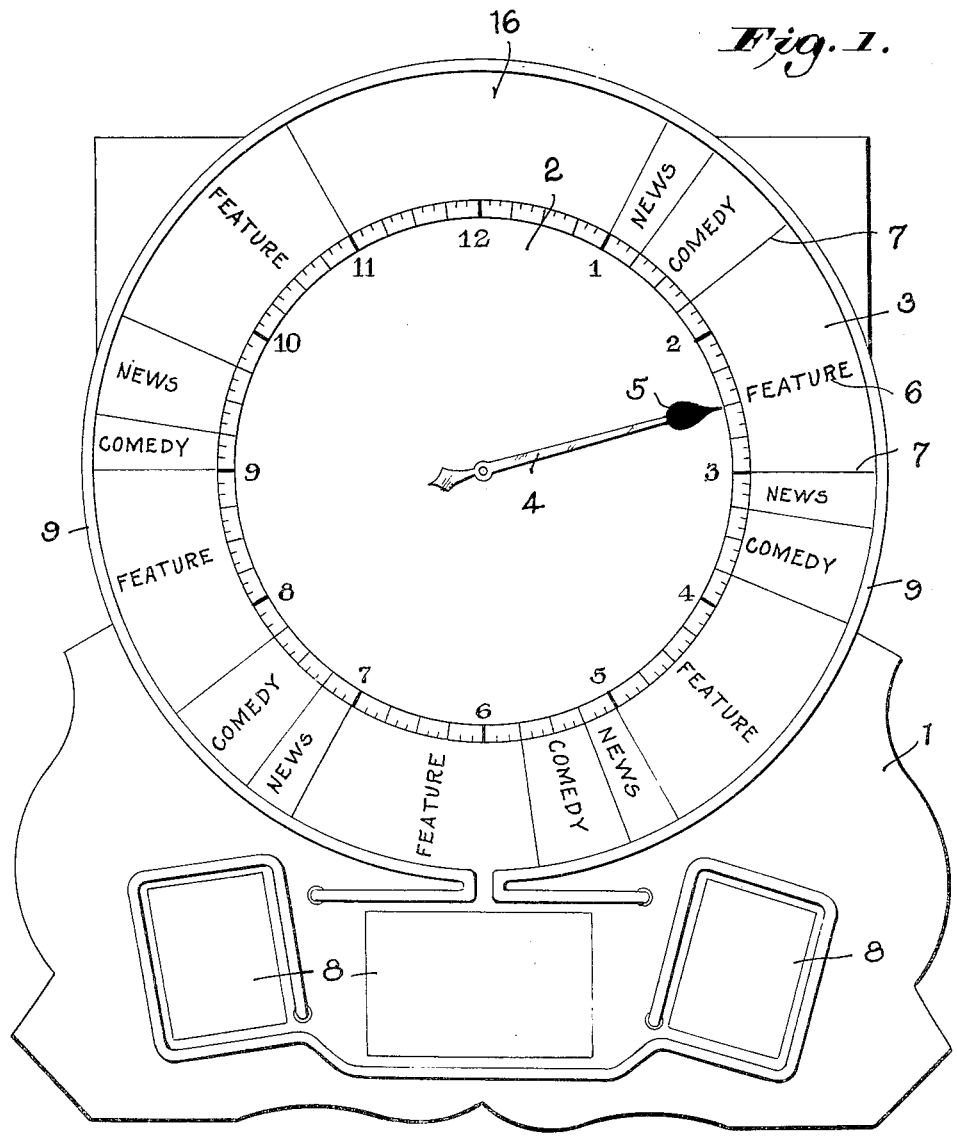
Figure 1 is a front view of one complete embodiment of the invention.

Referring now to the drawings, the program clock contemplated by our present invention conveniently includes a supporting surface in the form of a plaque 1 of any desirable and preferably ornamental contour. Mounted on the plaque as a background are a clock face 2 provided with hour numerals and an associated time scale, and a surrounding area 3, which may be circular and concentric with the clock face, or arcuate, surrounding less than the entire periphery of the clock face, but concentric therewith.

The central clock face 2 is adapted to carry an advertising display, and the face has associated with it a time indicating hand the body 4 of which may be formed of substantially transparent material, such as celluloid or the like, while the pointer portions 5 of the hand may be substantially opaque, to contrast with its background and clearly designate current time. Suitable clockwork mechanism is contained in a housing behind the clock face for operating the hand. It will thus be apparent that the advertising display carried by the clock face remains substantially unobscured from view during the movement of the hand around the clock face, regardless of any position which the hand may assume.

In the area 3 disposed about the periphery of the clock face 2 we provide indicia 6 representative of the component units of a theater program, and other indicia 7 cooperating with each other and with the clock time scale to indicate the time length of the program units. The indicia 6 and 7 may be provided in various alternative forms, as will be hereinafter more fully explained, but it is to be observed that the several indicia, especially the indicia 7, extend radially across the area 3 and register with markings on the time scale. It will be evident that the elements of the organization thus far described are capable of indicating to an observer the nature of the several program units, the time length of each unit, the current condition of the program, the current time, and the time to elapse before the beginning of the showing of the next program unit, all in the manner explained in the pending application above identified.

Various ornamental and advertising appurtenances may be associated with the program, in the form, for example, of advertising spaces 8 mounted on the plaque 1, and a luminous tube 9 surrounding the area 3, the clock face 2, the advertising spaces 8, or any of the elements of the program clock.

We prefer to make the indicia 6 and 7 readily detachable, adjustable and interchangeable, to accommodate the program clock to use in connection with programs which are frequently changed. To this end, the indicia used with any of the several modified forms of area 3 are preferably made in the form shown in Fig. 5. It will be noted that the element there shown includes a rod or wire, conveniently of metal, having a portion 10 adapted to lie on the area 3 and bear lettering, preferably indicative of the generic character of the program unit. The rod also includes a downwardly bent end portion 11, and a contiguous inwardly directed portion 12, both of the latter portions being adapted to fit over a margin of the member whose surface forms the area 3, so that the front of the element may be securely yet detachably associated with the area 3.

An alternative form of the indicia 6 or 7 is shown in Fig. 6, and comprises an element, conveniently of metal, provided with a prong 13 at each end, adapted to penetrate and secure the element to the material of the area 3.

It is to be understood that either type of element shown in Figs. 5 and 6 may be used to provide the indicia 6 and 7, or the two types of element may be used together in a single program clock. The latter embodiment is shown in Fig. 3, where the indicia 6a are made as shown in Fig. 5, and the indicia 7a are made as shown in Fig. 6. It will be evident that various combinations of the elements of Figs. 5 and 6 may be employed, and all such combinations are to be considered within the scope and purview of our invention and covered by the appended claims, although for economy of space on the drawings the several possible combinations are not individually shown.

An important embodiment of our invention contemplates the provision of a multiple program clock, i. e., one adapted to indicate simultaneously the current progress of each of a plurality of independent programs concurrently exhibited. In such a clock the area 3 is divided intermediate its inner and outer margins, to provide two or more circular or arcuate bands 14, 14, as shown in Fig. 3. With each band are associated indicia 6, 7, or 6a, 7a, and the indicia of each band independently represent and relate to the units of an independent program. It will be appreciated that such an embodiment of our program clock may be displayed to advantage in a public place, such as a hotel lobby or railroad depot, and the several bands of the single clock may each be employed to relate to the programs of different theaters.

A convenient combination of the multiple program bands 14, 14 and the indicia elements shown in Fig. 5 is illustrated in Fig. 3, where the division between adjacent bands in the area 3 is provided in the form of a slot 15 in the member the surface of which forms the area 3. The elements shown in Fig. 5 may be introduced into the slot 15 and engaged over the free edge of the member so that the elements lie against the surface of the member and radiate inwardly or outwardly in the respective bands. As has been explained, the indicia 7 or 7a, marking the time of beginning and ending of each program unit may be provided with end portions engaged in the slot 15.

A preferred embodiment of the invention is especially useful in connection with continuous programs which extend over less than or more than twelve hours of the day. Thus, while the clock shown in Fig. 1 is adapted for use in connection with a continuous program which begins at one o'clock and ends at 11 o'clock, the embodiment of the invention shown in Figs. 2 and 3 illustrate desirable modifications adapted for use in connection with programs which begin at 11 o'clock and continue through a period of twelve hours. In Fig. 1 the space 16 in the area 3 between the hours of eleven and one, during which no part of the program is exhibited, may be employed to contain text descriptive of the program units, such for example as the specific titles of the units generically identified by the indicia of the remainder of the area 3. In Figs. 2 and 3 where the program is shown continuously over a twelve hour period the spaces 17, corresponding to the space 16 of Fig. 1, may be provided by confining the twelve hour time scale to less than the entire periphery of the clock face, and positioning at the termini of the arcuate time scale hour numerals corresponding to the times of beginning and end of the continuous program. Thus, the embodiments shown in Figs. 2 and 3 are intended for use in connection with programs which begin at 11 a. m. and end at 11 p. m., the hour numeral 11 appearing twice in association with the time scale. Of course, the clockwork for driving a hand around the novel type of dial shown in Figs. 2 and 3 must necessarily operate at a speed appreciably slower than that of the clockwork used with the dial of Fig. 1, and the hand of Figs. 2 and 3 will require setting at the time of beginning and ending of the continuous program, for instance, at 11 o'clock in the case of the exemplification shown in Figs. 2 and 3.

The spaces 17 in the multiple program clock shown in Fig. 3 may be provided in a number equal to the number of bands 14 provided in the area 3, and each space 17 may be used to indicate the name and location of the theater whose program is indicated in corresponding band 14, together with the specific titles of its program units. It will be understood that the blank spaces following the words "Feature", "Comedy" and "News" in Figs. 2 and 3 are intended to contain the specific titles of the corresponding program units.

Figure 7:
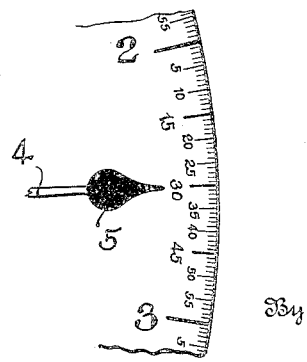
Fig. 7 is a fragmentary view of a preferred time scale and the cooperating portion of a hand.

In order to adapt the program clock to indicate readily and accurately the time of day and the current progress of a program unit, we prefer to provide each clock with a plurality of time scales, one positioned adjacent a margin of each band 14 in the case of a multiple-program clock, and one positioned adjacent the inner and the outer margins of the area 3 in the case of a single-program clock. Each time scale preferably contains individual minute markings, with numerals designating each five-minute mark, the hour, fifteen-minute and five-minute marks being relatively and progressively emphasized. Fig. 7 shows a portion of the form in which we prefer to provide each time scale. The several figures should be read as incorporating in each instance the type of time scale shown in Fig. 7, the detail of the specific time scale being omitted from Figs. 1, 2 and 3 for the sake of clarity of illustration.

We consider the type of indicator hand important. As has been explained, the body of the hand is preferably made transparent to reduce to a minimum the tendency of the hand to obscure advertising matter, portions of the time scale, or portions of the several indicia over which the hand moves. The pointer portion of the hand is made relatively opaque to contrast with its background and clearly register with the time scale marking to which the hand points. The hand may extend as far as the outermost peripheral time scale, as shown in Fig. 2, and it may be provided with a plurality of relatively opaque pointer portions, one for each time scale, as shown in Fig. 3. The hand may be driven by any convenient clockwork mechanism (not shown), and the hand is preferably an hour hand, used alone, although if desired the usual minute hand may also be employed.

We have found that elimination of the customary minute hand achieves the important object of making the clock readings accurate and clear to the casual passer-by. It is to be remembered that the successful functioning of the clock is largely dependent on its ability to indicate accurately and clearly the time, current condition of a program, and the time relationships of the program units, to observers at some distance without requiring such observers to examine the clock carefully. To this end, the clock is preferably made of fairly large size, for example not less than two feet in diameter, and the time scale is divided into fine subdivisions, preferably minute subdivisions.

It is to be understood that our invention is capable of embodiment in many varying forms. We have described hereinabove what we believe to be the essential and preferred features of the invention, and have illustrated in the drawings various embodiments of these features. Specific embodiments of the whole organization contemplated by our invention may be formed by variously selecting and arranging the features briefly explained and described in this application for Letters Patent, but all such selections and arrangements are deemed within the spirit of our invention to the extent that they embody the principles of the invention as pointed out in the appended claims.

Having thus described our invention what we claim and desire to secure by Letters Patent is:

1. A program clock including a central clock face adapted to carry an advertising display, in combination with a hand mounted to move across said face having a substantially opaque pointer end, the remainder of the hand, adapted to traverse the advertising display, being transparent, whereby the advertising display remains unobscured regardless of the position of the hand.

2. A program clock including a central clock face adapted to carry an advertising display and an area positioned about the periphery of the face carrying program indicia, a time scale positioned adjacent the outer margin of said area, and a hand mounted to move across said face and area having a substantially opaque pointer end, the remainder of the hand, adapted to traverse the advertising display, being transparent, whereby the advertising display remains unobscured regardless of the position of the hand.

3. A program clock including a central clock face adapted to carry an advertising display and an area positioned about the periphery of the face carrying program indicia, time scales positioned adjacent the outer and inner margins of said area, and a hand mounted to move across said face and area having substantially opaque pointers arranged to move through paths adjacent each time scale, the remainder of the hand, adapted to traverse the advertising display and the program indicia, being transparent, whereby the advertising display and the program indicia remain substantially unobscured regardless of the position of the hand.

4. A program clock including a central clock face and an arcuate area disposed around less than the entire periphery of the clock face, hour numerals carried by the face adjacent the arcuate area only, said numerals covering the total hours during which a continuous theatrical program is exhibited, the space between the ends of the arcuate area being devoid of hour numerals, elements detachably secured in said area, each element displaying a legend indicative of a unit of the program, other elements detachably secured in said area, each adjacent pair of said latter elements cooperating to indicate the time length of a unit of the program, and indicia displayed in the space between the opposite ends of the arcuate area adapted to convey additional information relating to said program.

5. A program clock including a central clock face, an arcuate area positioned about the periphery of the face, provided on a member having a free marginal edge, elements detachably secured in said area, each element displaying a legend indicative of a unit of the program, and other elements detachably secured in said area, each adjacent pair of said latter elements cooperating to indicate the time length of a unit of the program, some at least of the elements including a body portion associated with the area and another portion bent around the edge of the member and engaged with the back of the member.

6. A program clock including a central clock face, an arcuate area positioned about the periphery of the face, said arcuate area being a surface of a member provided with an arcuate slot intermediate its interior and exterior margins to divide the area into a plurality of bands, each band being adapted to contain indicia representative of the units of a different program simultaneously exhibited, elements detachably secured in said area, each element displaying a legend indicative of a unit of the program, and other elements detachably secured in said area, each adjacent pair of the latter elements cooperating to indicate the time length of a unit of the program, some of said elements including a bent portion penetrating the slot and engaged with the back of the member and another portion lying against the front of the member and extending radially inwardly of the band, and others of said elements including a bent portion penetrating the slot and engaged with the back of the member and another portion lying against the front of the member and extending radially outwardly of the band.

7. A program clock having a central clock face and an arcuate area positioned about the periphery of the face divided into a plurality of substantially concentric bands, each band containing indicia representative of the character and time-length of component units of different theatrical programs simultaneously exhibited, in combination with a movable hand having a relatively enlarged pointer portion arranged to move in an arcuate path adjacent a margin of each of the concentric bands, the pointer portions being substantially opaque and the remainder of the hand being substantially transparent, whereby obscuring of the indicia is reduced to a minimum regardless of the position of the hand.

8. A program clock designed for public use to give persons several feet away a time record of a variable entertainment presentation comprising a clock having a single hand, a substantially circular dial portion of relatively large diameter having a multiplicity of time division lines defining intervening spaces of individually small time value, a program band peripherally beyond the dial and concentric therewith, movable indicia carried by the band for designating the character of the individual program units, and movable means carried by the band having division lines adapted to be placed in prolongation of the time division lines to cooperate therewith and with the indicia to indicate the time of beginning, time of ending, and duration of the several program units.

HUGH W. SANFORD.
FRITZ H. THOMAS.